Sept. 25, 1956

E. P. PERTICS ET AL 2,764,077

SHIFTABLE CULTIVATOR

Filed Nov. 2, 1950

ELIAS P. PERTICS AND
EMIL E. PERTICS.
INVENTORS

BY Oltsch & Knobloch

ATTORNEYS.

Sept. 25, 1956 — E. P. PERTICS ET AL — 2,764,077
SHIFTABLE CULTIVATOR
Filed Nov. 2, 1950 — 5 Sheets-Sheet 4
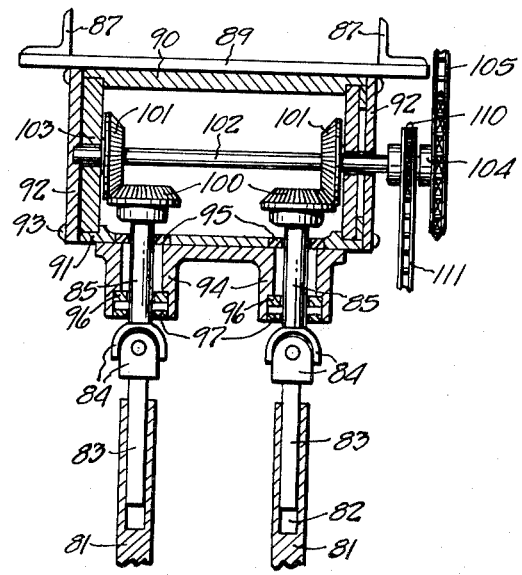
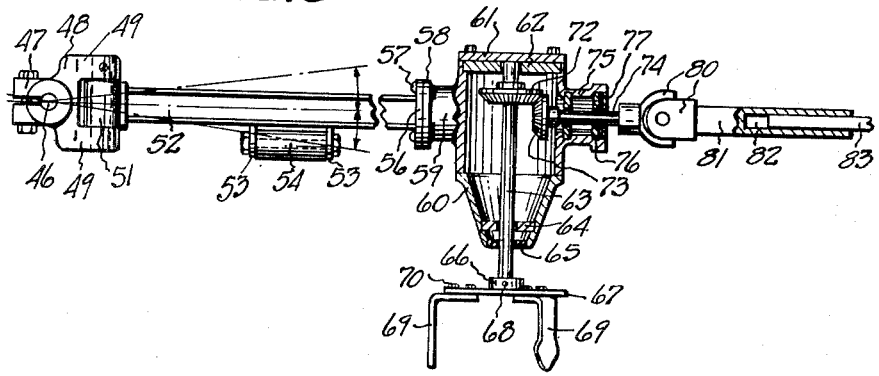
ELIAS P. PERTICS AND
EMIL E. PERTICS
INVENTORS
BY Altsch & Knoblock
ATTORNEYS.

Sept. 25, 1956     E. P. PERTICS ET AL     2,764,077
SHIFTABLE CULTIVATOR

Filed Nov. 2, 1950                          5 Sheets—Sheet 5

ELIAS P. PERTICS AND
EMIL E. PERTICS.
INVENTORS

BY Oltsch + Knoblock

ATTORNEYS.

United States Patent Office 2,764,077
Patented Sept. 25, 1956

2,764,077

SHIFTABLE CULTIVATOR

Elias P. Pertics and Emil E. Pertics, North Township, Marshall County, Ind.

Application November 2, 1950, Serial No. 193,576

15 Claims. (Cl. 97—43)

This invention relates to improvements in shiftable cultivators, and more particularly to a cultivator of the type having laterally shiftable cultivating elements to enable soil to be cultivated around and between plants positioned in rows. This invention is an improvement upon our co-pending U. S. patent application, Serial No. 174,214, filed July 17, 1950, now Patent No. 2,694,355, issued November 16, 1954.

In many types of farming where plants are positioned in rows and are spaced apart substantial distances in those rows, it is necessary to cultivate around the plants and between the plants in each row in order to secure favorable growing conditions. Instances which can be cited as illustrative of these conditions are fields in which blueberry plants, currant plants, vegetables or any bushy plants are grown, and also in vineyards. In most of these instances cross cultivation of the plants is not feasible. That is, the plants are planted in rows and spaced apart in the rows so as to permit cultivation by use of a tractor traveling lengthwise of the row but not crosswise of the row. Cultivation of such rows by the use of tractor-powered cultivators has usually been possible only in the space between the rows and, until the device of our co-pending patent application aforementioned, it has not been possible to accomplish cultivation either close to or between the plants in each row. Consequently, it has been necessary heretofore to cultivate by hand in addition to the powered cultivation. Such hand cultivation is laborious, time-consuming and expensive.

In the device described in our co-pending application it is possible to overcome the difficulties mentioned above, but it has been necessary that the tractor shall pass along a row at both sides thereof in order to properly and fully cultivate a given row of plants. This resulted from the fact that only one cultivator or tiller is provided, and, consequently, in traversing each row, cultivation can be provided only partially around the plants and it is necessary that a second pass or trip be made along the length of each row to complete the cultivation.

It is the principal object of this invention to provide a tractor-mounted device with a pair of cultivating units shiftable laterally relative to the tractor and to each other as selected while the tractor moves along the row, said tractor being adapted to pass along the row with its side wheels on opposite sides of the row and with its cultivating elements at opposite sides of the row.

A further object is to provide a device of this character with shiftable cultivating units and means for shifting said units in unison and equally in a direction transverse of the path of movement of the tractor.

A further object is to provide a cultivator with a pair of rotary cultivating units and means for independently adjusting the working depth and working attitude of each unit. A further object is to provide a tractor-mounted device of this character with a pair of cultivating units each mounted upon an elongated arm swiveled to a rigid frame at its front end portion, whereby said arms may be adjusted transversely relative to each other and vertically, and wherein a single power-actuated mechanism shifts said arms transversely and equally and accommodates all vertical adjustments of said arms.

Other objects will be apparent from the following specification.

In the drawings:

Fig. 5 is an enlarged horizontal longitudinal sectional view taken on line 5—5 of Fig. 1.

Fig. 6 is an enlarged fragmentary side view of one of the cultivator units and its associated parts, with parts thereof broken away and illustrated in cross-section.

Figure 1:
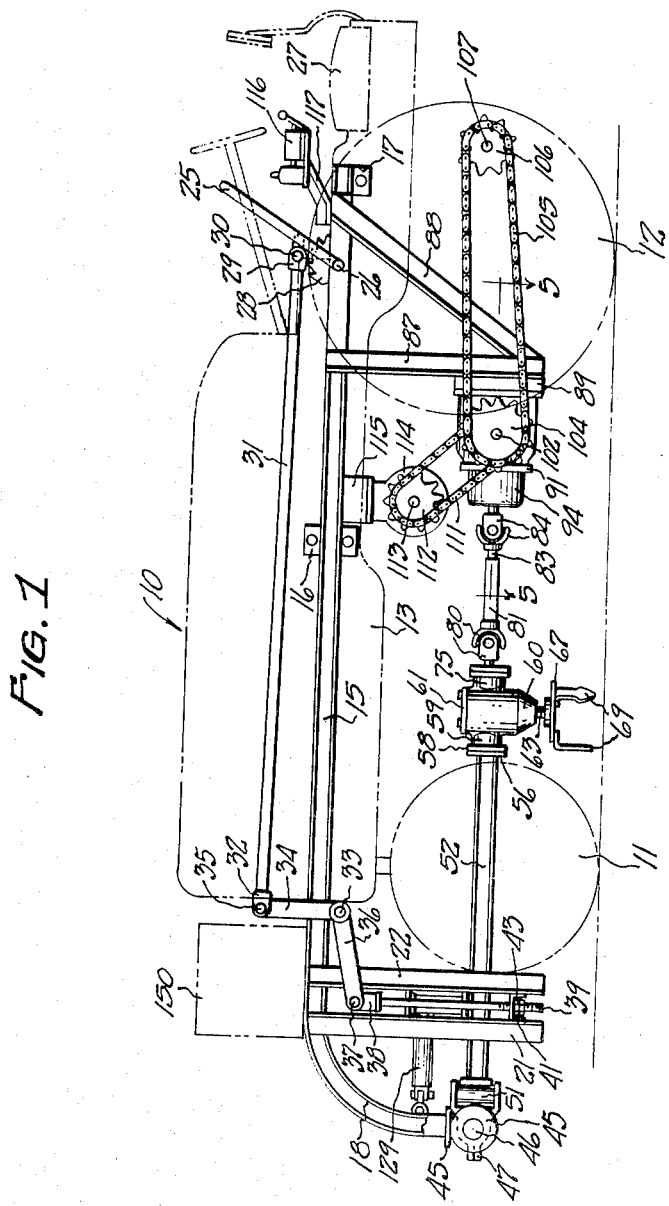
Fig. 1 is a view of the device in side elevation and illustrating a tractor in dotted lines.
Figure 2:
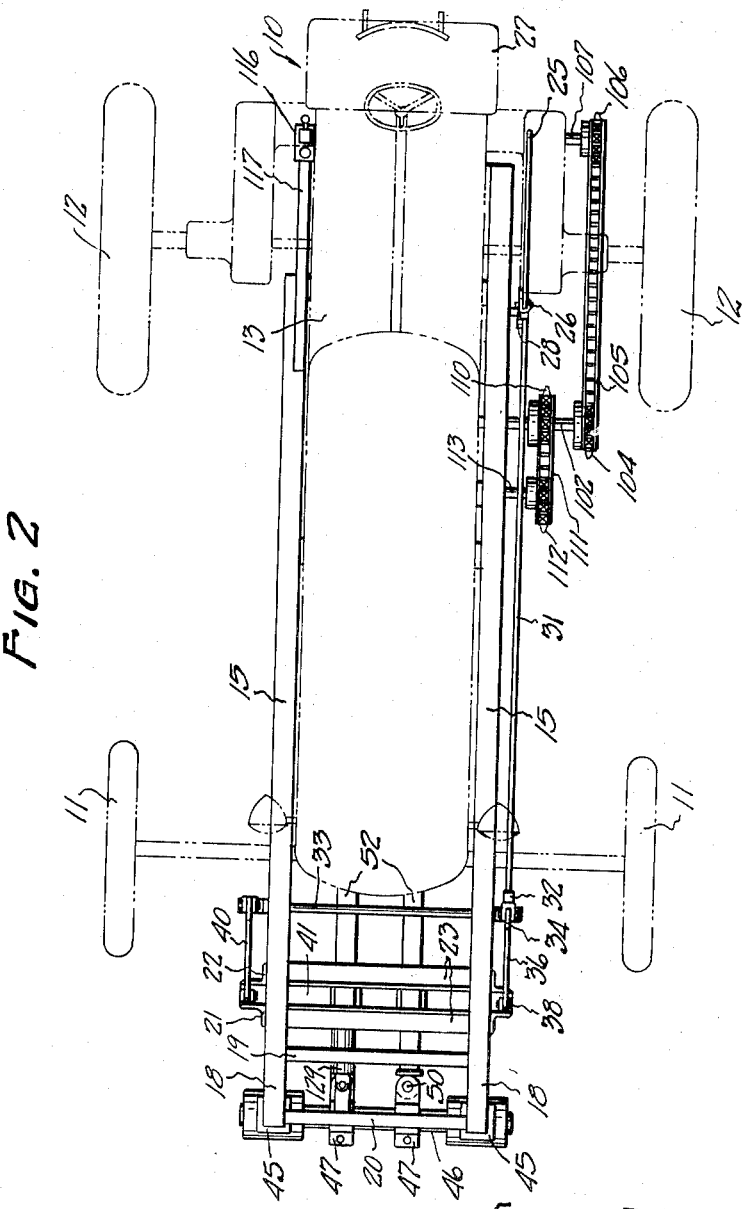
Fig. 2 is a top plan view of the device and illustrating a tractor in dotted lines.

Referring to the drawings which illustrate the preferred embodiment of the invention, the numeral 10 designates a tractor of the type having front wheels 11 and rear wheels 12 and a frame 13 which is mounted at a high level. The tractor may be of any standard wheeled type employing large wheels and having a high-ground clearance, or it may be of the type wherein the tractor chassis and frame are mounted at a higher than average elevation by means of elongated upright structures mounting stub shafts for the tractor wheels and positioning the tractor chassis above ground level at a height of three feet or more so that the tractor may straddle a row of plants with one wheel on each side of the row. Adapters are now available upon the market which will permit the conversion of standard tractors to such high mounting, and in some instances are of dimensions which permit the tractor to have clearance with the ground of six feet or more. The present invention is adapted for application to either a standard high level wheeled tractor or so-called "stilt mounted" tractor, and the size of the plants to be cultivated will determine which type of tractor is to be employed.

Our improved cultivator has a frame including a pair of elongated rigid frame members 15, preferably of channel shape in cross-section and rigid to withstand application of heavy stress thereto. The frame members 15 extend alongside the opposite sides of the tractor and are connected thereto at a plurality of longitudinally spaced points as by means of brackets 16 and 17 which preferably are bolted or otherwise detachably mounted upon the frame 13 of the tractor in a rigid and stress-sustaining position and relation. The forward ends of the frame members 15 project forwardly beyond the tractor and preferably include downwardly bent end portions 18. The forwardly and downwardly projecting portions 18 of the frame members 15 are fixedly interconnected as by means of a plurality of transverse frame members 19 and 20 which also are preferably channels. It will be understood that the use of channels for the parts 15, 18, 19 and 20, and any other parts of the device which are shown as channels, is illustrative and not intended to be limiting and that any elongated rigid structural member, either of a single structural part such as an I-beam, a T-beam or an H-beam, or a fabricated unit built up from a plurality of such standard structural members, may be employed.

At a point forwardly of the front wheels 11 of the tractor and preferably rearwardly of the cross-frame members 19 and 20, the frame members 15 mount a depending frame structure. This depending frame structure preferably includes a pair of upright rigid structural members 21 and 22 depending from the front portion of each frame member 15 in longitudinally spaced relation. The members 21 and 22 preferably constitute angle irons and are rigidly connected intermediate their height by cross-members 23 which cooperate to fixedly support a substantially horizontal cross-plate 24.

A hand lever 25 is pivoted at 26 to the rear end portion of one of the frame members 15 adjacent to the seat 27 of the tractor to be within reach of an operator seated upon the tractor. A toothed segment 28 is mounted fixedly upon the frame 15 adjacent the pivot 26 and is adapted to be engaged by a ratchet or pawl carried by a yoke 29 pivoted to the lever 25. The yoke 29 is mounted upon the rear end of an elongated link 31 which mounts a yoke 32 at its opposite end. A bellcrank lever is pivoted at 33 to a portion carried by the frame 15 adjacent to the depending frame members 21 and 22. The pivot 33 preferably constitutes a shaft extending transversely between the frame members 15. One arm 34 of the bellcrank is pivoted to the yoke 32 at 35. The other arm 36 of the bellcrank projects forwardly and has pivotally connected thereto at 37 a yoke 38 mounted upon the upper end of an elongated substantially upright rod 39. An arm 40 will be fixedly mounted upon the cross-shaft 33 at the side of the frame opposite that at which the link 31 is positioned and the arm 40 similarly pivots a yoke 38 of a second depending rod 39.

A rigid transverse structural member 41, here illustrated as a channel but which may be a plate or any other rigid structural shape, is positioned between the upright frame parts 21 and 22 to be guided thereby. The plate 41 has apertures 42 at its opposite ends through which the rods 39 pass, and the lower end of the rods 39 are screw-threaded to receive nuts 43 which support the cross-member 41 at a selected elevation or position with reference to the rods 39. The length of the cross-member 41 is sufficient to pass between the vertical guide members 21 and 22 depending from the frame at opposite sides of the frame. Consequently, the frame member 41 may be adjusted vertically by simple manipulation of the lever 25 while the operator remains in a seated position upon the tractor.

The lower front end portions 18 of the main frame members mount suitable bearings 45 within which a rigid cross-shaft 46 is journaled. A pair of clamps 47 are mounted upon the cross-shaft 46 in spaced relation to one another and preferably in substantially equally spaced relation to the adjacent side frame members 15, 18, that is, in substantially equally spaced relation from the longitudinal center of the shaft 46. The clamps 47 may be of any desired type and, as here illustrated, are detachably connected to the cross-shaft 46. Each clamp 47 is preferably an integral part of a yoke member 48 which extends rearwardly from the shaft and has vertically spaced rearwardly projecting upper and lower yoke arms 49. The arms 49 of each yoke have vertically aligned apertures within which a vertical shaft 50 is secured in any suitable manner.

A tubular bearing 51 fits snugly and rotatably between the yoke arms 49 in coaxial relation to the shaft 50 and is journaled upon that shaft. Each bearing 51 has welded or otherwise fixedly secured or anchored thereto one end of an elongated rigid arm 52, there being two arms 52 each extending generally longitudinally and rearwardly from one of the yokes 48. The arms 52 constitute structural members and are of any cross-sectional shape found suitable, such as of H-shape or other cross-sectional shape which will enable them to resist bending and to withstand both torsional and tensional stresses. The arms 52 pass between the two sets of depending guides 21, 22 of the frame and above the cross-member 41 of the frame. Each arm has a pair of brackets 53 depending therefrom in longitudinally spaced relation, and a roller 54 is journaled at its opposite ends in said brackets 53 with its axis being substantially parallel to the member 52 and substantially transverse of the cross-member 41. The rollers 54 bear upon the cross-member 41 and provide a second point of support for each arm 52 whereby the vertical position or ground clearance of the member 52 is determined. In other words, it will be apparent that whenever the lever 25 is operated to raise or lower the cross-member 41, that action will result in a longitudinal tilting of the elongated members 52 about the cross-shaft 46 as a center.

Each of the arms 52 preferably fixedly mounts a cross-plate 56 at its rear end. To this cross-plate 56 is detachably connected, as by means of bolts 57, a plate or flange 58, here illustrated as mounted upon a lateral projection 59 of a housing member 60. If desired, one of the parts 56, 58 may have concentric elongated slots therein (not shown) to accommodate rotative adjustment of the housing 60 so that the upright axis of that housing may be tilted to extend at any desired radial direction from the axis of the elongated member 50. The housing 60 preferably is open at its upper end and is provided with a cover plate 61 detachably mounted thereon. Any suitable bearing, here illustrated as an apertured journal plate 62, may be provided within the upper end of the housing to journal the upper end of a shaft 63. The shaft 63 projects through the housing 60 and through an opening in the lower end thereof to extend clear of the housing. The housing will preferably be provided with a bearing 64 adjacent its lower end and with an oil seal 65. This arrangement permits the retention of a lubricant within the housing 60. At its lower or projecting end the shaft 63 fits within a sleeve or hub 66 fixedly mounted upon the center of a plate 67. A tapered pin 68 may extend through aligned apertures in the hub 66 and shaft 63 to detachably anchor or connect the plate 67 to the shaft 63. The plate 67 will mount a plurality of tooth members 69 in equally spaced relation to the center thereof and detachably by means of the bolts 70. The teeth 69 will constitute soil-working members and are intended to be rotatably carried by the shaft 63 to rotate about an upright axis.

It will be understood that the specific construction of the ground-working unit or assembly as hereinabove described is illustrative and that any other desired type of ground-working tool found suitable may be mounted upon the end of each of the arms 52. In this connection it is apparent that the ground-working tool or unit which is mounted on the end of each arm need not be a power-driven unit but may be a ground-working tool of the character of a shovel, a spring tooth, disc gang, or any other type of ground-working or cultivating element or assembly now commonly used in the art.

In the embodiment of the invention herein illustrated where a power-driven ground-working implement is employed, the same may be of the construction shown wherein a bevel gear 72 is mounted upon the shaft 63 within the housing 60 and meshes with a bevel gear 73 mounted upon the end of a pinion shaft 74 which extends through a lateral projection 75 of the housing 60 and is journaled in bearings 76 carried by the housing part 75. An oil seal 77 may be provided at the end of the housing part 75.

The outer end of pinion shaft 74 mounts a universal joint 80 which is connected to an elongated rigid member 81 having a longitudinal bore 82 of non-circular cross-section. A rigid shaft 83 of substantially the same cross-sectional shape as the bore 82 fits slidably and non-rotatably within said bore 82 to form with the member 81 a telescoping longitudinally extensible drive-transmitting member. The shaft 83 is secured to one element of a universal joint 84 to which a shaft 85 is also connected. Thus it will be apparent that the parts 85, 83, 81 and 74 constitute an elongated longitudinally extensible drive-transmitting shaft assembly having two universal joints therein to accommodate a wide range of changes of position of the terminal shaft portions 74 and 85.

The frame members 15 each mount a depending frame unit at their rear ends, here illustrated in Fig. 1 as consisting of downwardly converging angle irons or frame members 87 and 88, which are welded or otherwise suitably secured at their upper ends to frame members 15 and which are secured to each other at their lower ends. The depending frame members 87 at opposite sides of the frame are interconnected by a rigid transverse plate unit 89 positioned in a substantially vertical plane. A gear case is mounted upon the plate 89, the same preferably having a base or back wall 90 which is secured to the plate 89 by bolts or other securing means (not shown). The case includes a front wall unit 91 and bottom and top walls preferably integral with the walls 90 and 91. End plates 92 are preferably detachably mounted upon the gear case at its ends as by means of bolts, screws or other securing members 93. The front wall 91 of the gear casing is preferably provided with a pair of apertures to receive the two pinion shafts 85, and a cover plate unit may be mounted upon the front plate 91 to provide a pair of tubular forward projections 94 substantially concentric with the apertures receiving the pinion shafts 85. Bearings 95 serve to journal the inner ends of the shafts 85 and bearings 96 journal the outer end portions of said shafts. The bearings 95 and 96 are arranged concentric of said shafts in longitudinally spaced relation adjacent the inner and outer ends, respectively, of the tubular gear casings 94. As desired, each of the tubular projections 94 may mount an oil seal 97.

The inner ends of the pinion shafts 85 project into the gear housing and each mounts a bevel gear 100. The gears 100 mesh with bevel gears 101 mounted upon a shaft 102 extending lengthwise of the gear casing 90, 91 and journaled at its opposite ends adjacent to the end walls 92 by bearings or journal means 103. The outer end of the shaft 102 mounts a sprocket 104, around which is trained a drive chain 105.

The drive chain 105 is trained around a sprocket 106 mounted on a drive take-off shaft 107 projecting from the transmission of the tractor in any manner found suitable or conventional. By this arrangement it will be apparent that the shaft 107 connected with the tractor transmission to be driven at will from the tractor engine serves as means to power and rotate the cultivator means 69. As best seen in Fig. 5, the preferred arrangement of the drive will be such that the two pinions 100 on the two pinion shafts 85 leading to the two different cultivator heads 69 rotate in opposite directions. The drive between the parts is positive and accommodates both lateral and vertical adjustment of the position of the cultivators by reason of the incorporation of the two universal joints 80 and 84 in the drive unit and also by reason of the telescoping extensible nature of the drive shaft at the parts 82 and 83.

The shaft 102 projecting from the gear box mounts a second sprocket 110, around which is trained a chain 111, in turn trained around a sprocket 112 mounted upon a shaft 113. The shaft 113 projects from and serves to drive a pump 114 which is mounted upon the adjacent frame member 15 by a bracket or part 115. The pump 114 is an hydraulic pump preferably of the type adapted to pump a high volume of liquid at high pressure.

At the rear portion of one of the frame members 15 adjacent to the seat 27 to be within reach of an operator sitting upon that seat, is located a control valve 116 being mounted upon a bracket or support 117 secured to the frame member 15. This bracket 117 will preferably be positioned upon the frame member 15 opposite that which carries the adjusting lever 25.

Figure 3:
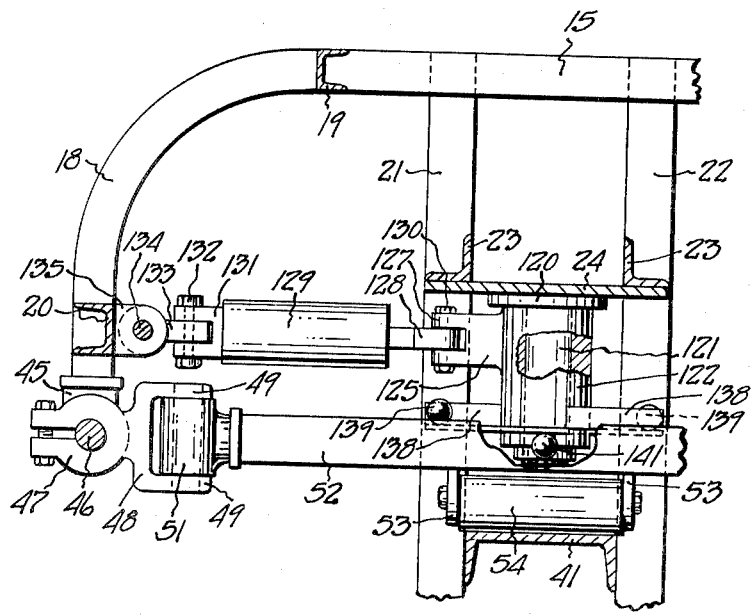
Fig. 3 is an enlarged fragmentary detail view illustrating the front end portion of the device in side elevation with parts shown in cross-section.
Figure 4:
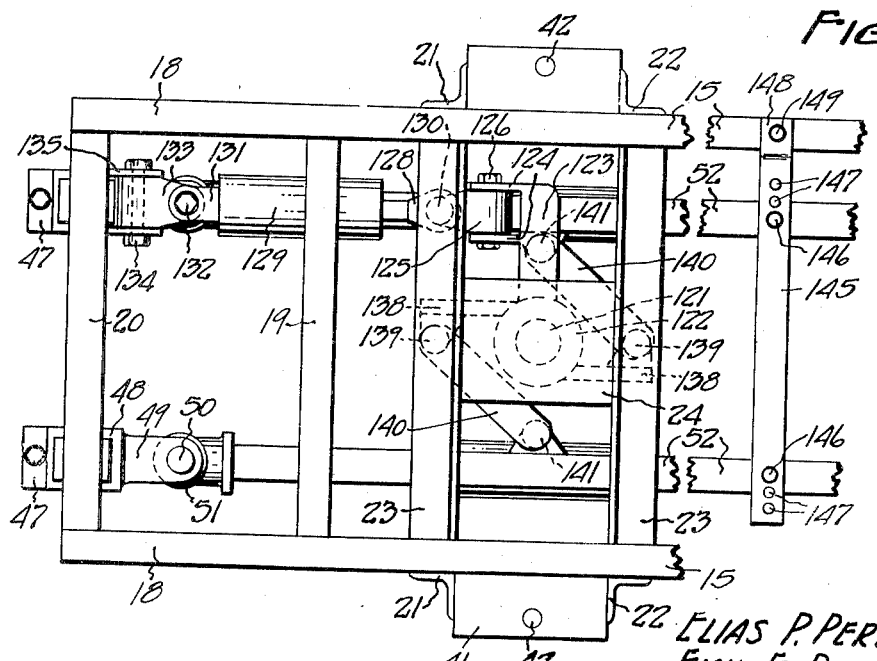
Fig. 4 is a top plan view of the parts assembly shown in Fig. 3.

Referring now to the construction best shown in Figs. 3 and 4, the cross-plate 24 has welded or otherwise fixedly secured thereto substantially centrally between the crossbars 23 an enlarged flange or head 120 of a rigid pivot shaft 121 which depends from the plate 120. A bearing sleeve 122 encircles the shaft 121. A rigid arm 123 projects radially from the sleeve 122 and terminates in a pair of spaced substantially parallel flanges 124 projecting transversely from the arm 123. A yoke member 125 is pivoted to the flanges 124 by a horizontal bolt or pin 126. At its free end the yoke member has a bifurcated portion 127 which receives and pivotally connects the flattened end portion 128 of the arbor of an hydraulic cylinder piston unit 129. The parts 127 and 128 are connected to pivot about a vertical axis by a pivot pin or bolt 130. The hydraulic cylinder piston unit 129 is preferably of the double acting type, and the end of the cylinder opposite that from which the arbor part 128 projects includes a bifurcated portion 131 to which is pivotally connected by a bolt, pin or other means 132, preferably located vertically, a yoke member 133. The yoke member 133 in turn is pivotally connected by a bolt or pin 134, preferably horizontally positioned, to a bracket or support 135 which is secured to the crossbar 20. It will be apparent, therefore, that when the cylinder piston unit 129 is actuated, the sleeve 122 will be caused to rotate in one direction or the other about the pin 121.

The sleeve 122 has a pair of arms 138 fixedly anchored thereto adjacent its lower end, said arms being arranged in opposing relation to each other at or adjacent the level at which the elongated arms 52 are normally positioned. Each of the rigid arms 138 mounts a ball 139 projecting laterally therefrom. A pair of links 140, each provided with a socket at one end adapted to fit around a ball 139, is thus connected by a ball and socket joint to the sleeve 121 through the arms 138 and the balls 139. The opposite end of each link 140 is similarly socketed to fit around or embrace a ball member 141 welded or otherwise fixedly secured to the adjacent arm 52. It will be apparent, therefore, that when the sleeve 122 is caused to rotate about the shaft 121 in response to actuation of the hydraulic unit 129, the rotative motion of said sleeve is transmitted through links 140 to the elongated arms 52 simultaneously and substantially equally to cause the arms 52 to swing about their vertical pivot axes 50 either inwardly or outwardly with reference to the sleeve 122 and the lateral frame members 15. In this movement the rollers 54 upon the arms 52 accommodate the swinging of the arms 52 which rollers roll upon the cross-guide 41.

In some instances it may be desirable to anchor the arms 52 in one of a number of selected positions. Any suitable means may be provided for that purpose and, as here illustrated in Fig. 4, a rigid cross-shaft or bar 145 may be secured detachably to the arms 52 by means of bolts 146, which bolts preferably pass through a selected one of a series of spaced openings 147. The bar 145 may include an end portion 148 which extends into engagement with one of the frame members 15 so that the member 145 may be secured to the cross-member 15 as by bolts or other detachable securing means 149. Mechanism of this character is used in cases where the device is intended to be held against any lateral movement and in which it is desired to insure that the arms 52 will not be deflected about their pivots in the event one or both of the ground-working tools carried thereby should strike an obstruction tending normally to deflect them.

Figure 9:
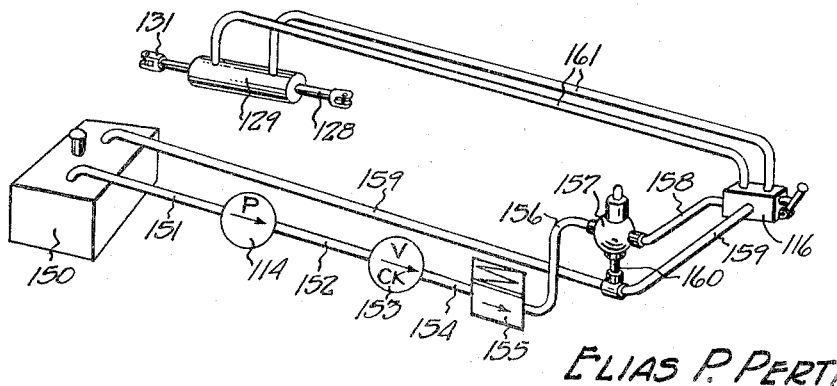
Fig. 9 is a part schematic view illustrating the hydraulic system of the device.

The hydraulic mechanism usable with the device is best illustrated in Fig. 9. A tank or reservoir 150 is mounted upon the tractor at any suitable position as at the front of the tractor upon the projecting portions of the frame members 15 seen in Fig. 1. A line 151 communicates with the tank 150 and leads to the pump 114. A line 152 leads from the outlet of the pump 114 to a check valve 153. A line 154 connects the check valve 153 with any suitable type of a mechanical pressure accumulator 155. A line 156 leads from the pressure accumulator to a pressure relief valve 157. A line 158 connects the pressure relief valve 157 to the manually operated control valve 116. A return line 159 connects the reservoir 150 and the control valve 116 and has a branch 160 which communicates with the pressure relief valve 157. Conduits 161 connect the control valve 116 with the opposite ends of the cylinder of the hydraulic cylinder piston power member 129.

Figure 7:
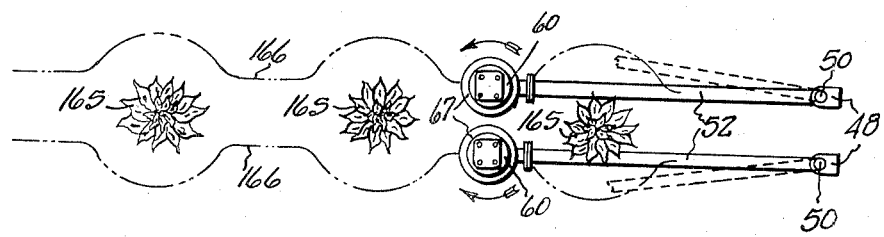
Fig. 7 is a schematic view illustrating the manner in which the device operates.
Figure 8:
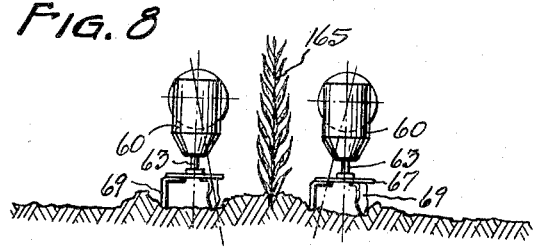
Fig. 8 is a view illustrating the relation of a pair of cultivator elements with reference to the plant being cultivated.

This device is particularly well adapted for use in the manner illustrated in Figs. 7 and 8, wherein the tractor is caused to traverse a row of plants 165 set in the row in spaced relation as shown. The path of travel of the tractor is such that the cultivator heads 69 travel along opposite sides of the plants in the row, being drawn by the arms 52. These arms 52 pivot about the vertical axes 50 so that they may swing between the full line position and the dotted line position shown in Fig. 7. Thereby the center of each of the cultivator rotors 69 is enabled to follow an irregular path as illustrated by dotted lines 166 in Fig. 7, said path entailing movement of the cutters side by side in parallel paths at the parts of the row between the plants 165 and moving outwardly around and clear of the plants as the same are reached, as also illustrated in Fig. 8. The arrows in Fig. 7 illustrate the direction in which the rotary cultivators 67 revolve, and it will be observed that this direction of rotation results in a forward and inward travel of the cultivator teeth 69 as they approach each other. This direction of movement tends normally to cause earth worked and displaced by the teeth 69 to be moved inwardly and tends to form a slight hill or ridge between the cultivator heads. The tendency of the heads to throw earth inward also tends to build up hills around the plants 165 which usually is an advantageous feature. The extent to which earth is thrown inwardly can be regulated by varying the attitude at which the casings 60 and the rotary shafts 63 extend with reference to the vertical. Thus, as seen in Fig. 8, it is possible to tilt the casing 60 and the cultivators to a substantial extent, as illustrated by the inclined center line shown in Fig. 8, and thereby producing a substantial hilling action. It will be understood, of course, that the use of a rotary tool is illustrative and not limiting and that each of the arms 52, as hereinabove mentioned, may carry a shovel element, a plow element, or one or more disc blades, and in each instance the member can be caused by operation of the device to follow the path 166 shown in Fig. 7 to perform cultivation of soil between the plants within the row while avoiding injury to the plants themselves.

Any method found suitable may be employed for the purpose of tilting the vertical axis of the casing 60. As herein described, that can be accommodated by means of elongated slots in one or the other of two plate parts 56 and 57 which are detachably connected together by screws 57. Another means by which mechanism of this character may be adjusted tiltably is illustrated in our co-pending U. S. patent application, Ser. No. 174,214, filed July 17, 1950, mentioned above. These two methods of adjusting the vertical position or attitude of the cultivator are illustrative and it will be understood that still other means may be employed if desired.

Regardless of the type of cultivating unit which is employed, that is, whether that unit is of the rotating type illustrated or of a non-rotary type, the device affords full and accurate control of the depth at which the cultivating tool operates. This is effected by the adjustment of the vertical position of the cross-member 41 upon which the rollers 54 carried by the arms 52 bear. This adjustment is normally effected for simultaneous and equal components of vertical tilting movement applied at the two longitudinal arms 52, because of the provision of the single lever 25 and its operation of the cross-shaft 33 for rotating both of the parts 36 and 40. It is possible, however, to secure independent adjustment of one arm with respect to the other by simply changing the adjustment or position of the nut 43 upon one of the rods 39 relative to the other. In most instances, however, simultaneous and equal vertical components of movement of the arms 52 will be desired, and the adjustment of the nuts 43 will serve merely for initial proper adjustment of the parts to be followed by the manipulation of the lever 25 only.

The lateral movement of the cultivator head 67, 69 is controlled by the valve 116. This valve will normally be positioned inwardly so that the flow of oil or other liquid in the system will occur in the following circuit: From tank 150 through line 151 to pump 114, thence through high pressure line 152, check valve 153, line 154, accumulator 155 and line 156 to relief valve 157, conduit 158 to control valve 116, and from control valve 116 through the return line 159 to the tank 150.

When the position of the valve 116 is changed by operating its control lever or handle, fluid in the system is diverted by the valve 116 from supply line 158 to one of the two conduits 161 and thence to the cylinder 129. At the same time the valve opens communication between the other conduit 161 and the return line 159 so that as liquid under pressure enters one end of the cylinder 129, the liquid at the other end of that double acting piston unit may be discharged. By having a system of sufficiently high pressure and high volume it is possible to secure substantially instantaneous response of the cylinder piston unit 129 and to secure sufficient power so that the arms 52 may be moved laterally while the tractor is traveling forwardly so that the cultivator unit, such as the head 67, 69, will follow the path indicated by line 166 in Fig. 7.

One advantage of this form of the device is the compactness of the unit resulting from the arrangement of the parts by which the two arms 52 are connected at the front ends to the implement frame to be pulled thereby, and in which a single gear casing adjacent to the rear of the frame provides means for driving each of two cultivator heads mounted by the respective arms. Note that no stress is placed upon the driving means incident either to vertical or lateral adjustment of the various arms, and no interference with proper functioning can occur. The pull forces are exerted upon the front of the arms and, if any variation occurs in the setting of either of the arms, that variation is fully accommodated by the universal joints and the telescoping drive shaft parts.

The cultivators will, in normal functioning, be positioned below the engine and forwardly of the driver's seat. The usual construction of a tractor is one wherein the hood is comparatively narrow, and a high degree of vision is provided. This will, in the present instance, provide the necessary vision of the operator to permit him to control the valve 116 for purposes of proper use in cultivating. In other words, when the cultivating heads are placed side by side at a position below and forwardly of the driver's seat 27, it will be possible for the driver, by watching one of the cultivator heads and the various plants or bushes 165, to control accurately the movement of both of the cultivators to pass outwardly of the plants as each plant in the row is encountered. It will be apparent, therefore, that by a single operation it is possible for an operator using this equipment to traverse the entire length of a row and to hoe completely around each plant, including hoeing or cultivating between the plants in the row. The only additional operation which may then be required would be in the event it is desired to cultivate the soil between adjacent rows, and that can either be performed with this unit by causing the tractor to travel between two rows of plants, or it can be accomplished by mounting another unit, such as a standard type of cultivator, upon the tractor.

While the form of invention herein shown and described is preferred, it will be understood that changes in the construction may be made within the scope of the appended claims without departing from the spirit of the invention.

We claim:

1. A cultivator adapted to be mounted on a tractive vehicle having a power take-off member, comprising a frame, means for securing said frame to a vehicle, a pair of elongated arms pivotally secured to the front of said frame in laterally spaced relation, guide means on said frame supporting said arms spaced from said pivot for guiding lateral pivotal movement of said arms, a soil-working unit carried by each arm and including a driven part, and drive means for said driven part adapted to be connected to said power take-off member, said drive means extending rearwardly from said soil-working units and including a part carried by said frame and a pair of flexible and extensible parts connecting said soil-working units with said frame-carried part.

2. A cultivator adapted to be mounted on a tractive vehicle having a power take-off member, comprising a frame, means for securing said frame to a vehicle, a pair of elongated arms pivotally secured to the front of said frame in laterally spaced relation, means on said frame for supporting said arms spaced from said pivot and guiding pivotal lateral movement of said arms, a soil-working unit carried by each arm and including a driven part, a gear unit carried by said frame in rearwardly spaced relation to said soil-working units and including two driving connections, drive transmission means connected to said gear unit and adapted to be connected to said power take-off member, and a pair of elongated flexible and extensible drive members each connecting a soil-working unit to a driving connection of said gear unit.

3. A cultivator adapted to be mounted on a tractive vehicle having a power take-off member, comprising a frame adapted to be secured to the vehicle to project forwardly therefrom, a pair of elongated arms secured to the front of said frame in laterally spaced relation, a soil-working unit carried by each arm and including a driven part, drive means carried by said frame and adapted for driving connection with said power take-off member, said drive means including a pair of flexible and extensible shaft units, said arms each having a swivel connection with said frame, a transverse support carried by said frame and engaging said arms intermediate the ends thereof, means for vertically adjusting said support relative to said frame, and means for shifting said arms laterally on said support.

4. A cultivator adapted to be mounted on a tractive vehicle having a power take-off member, comprising a frame adapted to be secured to the vehicle to project forwardly therefrom, a pair of elongated arms secured to the front of said frame in laterally spaced relation, a soil-working unit carried by each arm and including a driven part, drive means carried by said frame and adapted for driving connection with said power take-off member, said drive means including a pair of flexible and extensible shaft units, said arms each having a swivel connection with said frame, arm guide means vertically adjustable on said frame, and means for swinging said arms laterally relative to said frame and to each other along said guide means.

5. A cultivator adapted to be mounted on a tractive vehicle having a power take-off member, comprising a frame adapted to be secured to the vehicle to project forwardly therefrom, a pair of elongated arms secured to the front of said frame in laterally spaced relation, a soil-working unit carried by each arm and including a driven part, drive means carried by said frame and adapted for driving connection with said power take-off member, said drive means including a pair of flexible and extensible shaft units, said arms each having a swivel connection with said frame, power actuated means for swinging said arms simultaneously laterally, and guide means vertically adjusted on said frames spaced from said swivel connection for guiding swinging of said arms laterally.

6. A cultivator adapted to be mounted on a tractive vehicle having a power take-off member, comprising a frame adapted to be secured to the vehicle to project forwardly therefrom, a pair of elongated arms secured to the front of said frame in laterally spaced relation, a soil-working unit carried by each arm and including a driven part, drive means carried by said frame and adapted for driving connection with said power take-off member, said drive means including a pair of flexible and extensible shaft units, said arms each having a swivel connection with said frame, guide means on said frame supporting said arms rearwardly spaced from their connection with the frame, a rotatable member carried by said frame between said arms, a pair of links each pivoted at its ends to said rotatable member and to an arm, and power-actuated means for rotating said rotatable member whereby said arms swing laterally toward and from each other along said guide means.

7. A cultivator adapted to be mounted on a wheeled tractive vehicle, comprising a frame adapted to be mounted on said vehicle to project forwardly therefrom, a pair of laterally spaced elongated arms each having a swiveled draft connection with the front of said frame and adapted to project rearwardly therefrom between the vehicle wheels and below the vehicle, support means carried adjustably on said frame spaced rearwardly from said swivel draft connection, a soil-working unit carried by each arm, said units being arranged in transverse alignment, and means for simultaneously shifting said arms transversely on said support means to vary the spacing between said units.

8. A cultivator adapted to be mounted on a wheeled tractive vehicle, comprising a frame adapted to be mounted on said vehicle to project forwardly therefrom, a pair of laterally spaced elongated arms each having a swivelled draft connection with the front of said frame and adapted to project rearwardly therefrom between the vehicle wheels and below the vehicle, an arm support carried by said frame rearwardly spaced from said draft connection, a soil-working unit carried by each arm, said units being arranged in transverse alignment, means for shifting said arms transversely on said support to vary the spacing between said units, said soil-working units each including a driven part, and drive means adapted to be connected to said tractor for actaution thereby, said drive means including a unit carried by said frame rearwardly of said soil-working units and having a pair of driving connections and an elongated flexible and extensible shaft extending between each of said driving connections and a driven part of a soil-working unit.

9. A cultivator adapted to be mounted on a wheeled tractive vehicle, comprising a frame adapted to be mounted on said vehicle to project forwardly therefrom, a pair of laterally spaced elongated arms each having a swiveled draft connection with the front of said frame and adapted to project rearwardly therefrom between the vehicle wheels and below the vehicle, a soil-working unit carried by each arm, said units being arranged in transverse alignment, and means for simultaneously shifting said arms transversely to vary the spacing between said units, said frame including a depending front portion at which said arms are connected and a depending guide portion cooperating with an intermediate portion of each arm to support the same.

10. A cultivator comprising a frame adapted to be mounted on a vehicle, a pair of laterally spaced elongated rigid arms swivelly connected at their front ends to said frame, a tool unit carried by the rear end of each arm, a pair of laterally spaced depending guides carried by said frame in rearwardly spaced relation to the connections of said arms with said frame, a transverse support shiftable vertically along said guides, said arms bearing upon said transverse support, and means for adjusting the position of said support.

11. A cultivator as defined in claim 10, wherein each guide includes a pair of spaced upright members, each end portion of said support being positioned between a pair of said upright members, and wherein said adjusting means includes a cross-shaft journaled on said frame, levers mounted on the ends of said shaft, links connecting the levers with the ends of said transverse support, and means for rocking said cross-shaft.

12. A cultivator comprising a frame adapted to be mounted on a vehicle, a pair of laterally spaced elongated rigid arms swivelly connected at their front ends to said frame, a tool unit carried by the rear end of each arm, a pair of laterally spaced guides carried by said frame in rearwardly spaced relation to the connections of said arms with said frame, a transverse support shiftable vertically along said guides, said arms bearing upon said transverse support, a rotatable member supported by said frame in substantially transversely centered relation and spaced rearwardly from the connection between said arms and said frame, a link connecting each arm to said rotatable member, and means for rotating said member.

13. A cultivator comprising a frame adapted to be mounted on a vehicle, a pair of laterally spaced elongated rigid arms swivelly connected at their front ends to said frame, a tool unit carried by the rear end of each arm, a pair of laterally spaced depending guides carried by said frame in rearwardly spaced relation to the connections of said arms with said frame, a transverse support shiftable vertically along said guides, said arms bearing upon said transverse support, a rotatable member journaled on said frame in substantially transversely centered relation to said frame and arms and spaced rearwardly from the front ends of said arms, a pair of rigid links each having a swiveled connection with an arm at one end and a swiveled eccentric connection with said rotatable member at its other end, and means for rotating said member.

14. A cultivator comprising a frame adapted to be mounted on a vehicle, a pair of laterally spaced elongated rigid arms swivelly connected at their front ends to said frame, a tool unit carried by the rear end of each arm, a pair of laterally spaced depending guides carried by said frame in rearwardly spaced relation to the connections of said arms with said frame, a transverse support shiftable vertically along said guides, said arms bearing upon said transverse support, a rotatable member journaled by said frame substantially midway between said arms and spaced rearwardly from the front ends of said arms, a pair of rigid links each pivoted at one end to an arm and at its other end to said rotatable member in off-center relation, a lateral projection carried fixedly by said rotatable member, and a double-acting hydraulic power member connecting said projection and said frame.

15. A cultivator as defined in claim 14, wherein said power member constitutes an elongated cylinder piston unit, and wherein swivel means connects the opposite ends of said unit to said frame and said projection.

References Cited in the file of this patent

UNITED STATES PATENTS

| | | |
|---|---|---|
| 839,536 | Bates | Dec. 25, 1906 |
| 987,855 | Burton | Mar. 28, 1911 |
| 1,003,408 | Ainslie | Sept. 19, 1911 |
| 1,262,286 | Thomas | Apr. 9, 1918 |
| 1,506,042 | Bauer | Aug. 26, 1924 |
| 1,541,955 | Hollenbeck | June 16, 1925 |
| 1,577,947 | Burkey | Mar. 23, 1926 |
| 1,581,404 | Smith | Apr. 20, 1926 |
| 1,787,228 | Zalesky | Dec. 30, 1930 |
| 2,413,429 | Bomford | Dec. 31, 1946 |
| 2,440,757 | Peters | May 4, 1948 |
| 2,598,219 | Burgess | May 27, 1952 |

FOREIGN PATENTS

| | | |
|---|---|---|
| 338,258 | Germany | June 14, 1921 |